July 22, 1969  H. M. FORMAN  3,456,780
QUICK-OPENING SHRINK FILM PACKAGE
Filed Nov. 9, 1967
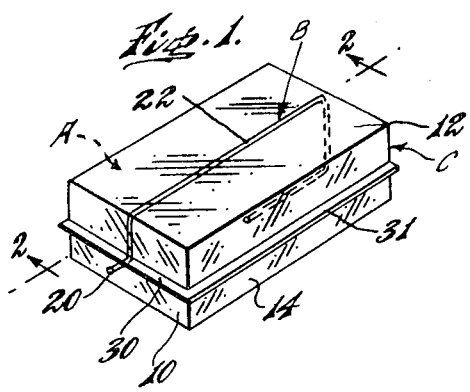
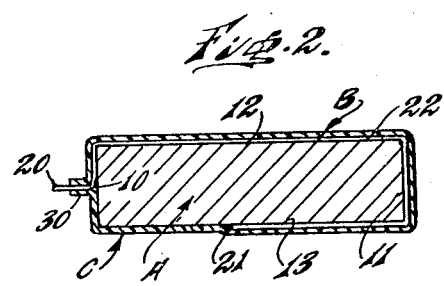
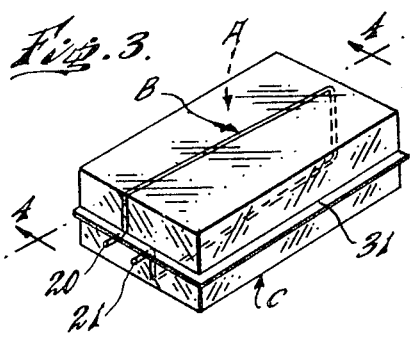
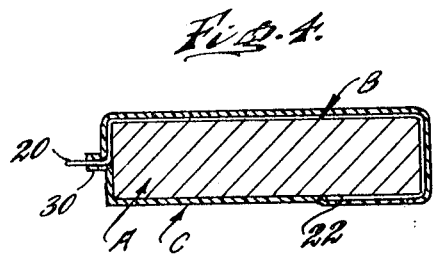
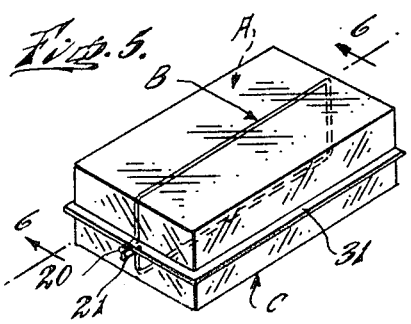
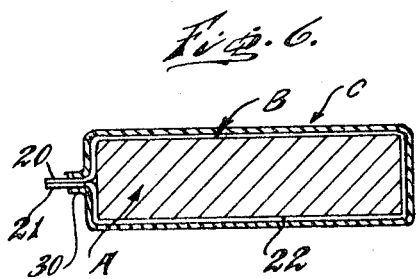
INVENTOR.
Harold M. Forman
BY Barry Moyerman
ATTORNEY

United States Patent Office 3,456,780
Patented July 22, 1969

3,456,780
QUICK-OPENING SHRINK FILM PACKAGE
Harold M. Forman, 2510 Grant Road,
Broomall, Pa. 19008
Continuation-in-part of application Ser. No. 547,509,
May 4, 1966. This application Nov. 9, 1967, Ser.
No. 681,854
Int. Cl. B65d 85/00, 17/00, 5/54, 5/70
U.S. Cl. 206—46                                7 Claims

ABSTRACT OF THE DISCLOSURE

Quick opening of packages comprising an item overwrapped with tensioned heat-shrunk axially oriented thermoplastic film and having at least one sealed edge is made possible by providing a cutter between the film and the overwrapped item, said cutter extending longitudinally about the item and having one end which extends outwardly through the sealed edge. The other end of the cutter is frictionally detented so that by pulling the end which extends back toward the detented end, progressive cutting of the film is achieved.

CROSS-REFERENCE TO RELATED APPLICATION

This application is a continuation-in-part of application Ser. No. 547,509 filed May 4, 1966, entitled, "Quick-Opening Shrink Film Package and Packaging Method," now Patent No. 3,352,480 which issued on Nov. 14, 1967.

BACKGROUND OF THE INVENTION

Field of the invention

This invention pertains to shrink packaging. More particularly, it relates to shrink packages which can be quickly and easily opened utilizing a cutter which is an integral part of the package.

Description of the prior art

The techniques, advantages and attributes of shrink packaging are well known to those skilled in the art. The general subject matter is fully discussed in an article entitled, "The Growth of Shrink Packaging," by Robert D. Lowry which appears at p. 243 et seq. in the 1965 edition of "The Modern Packaging Encyclopedia."

These packaging techniques take advantage of the unique properties of various axially oriented thermoplastic films. These films, when heated, shrink in either or both length and width.

As used henceforth herein, the term "axially oriented thermoplastic film" is intended to encompass all materials which are adapted for use in connection with shrink packaging. Illustrative of such materials are those listed in the table on page 243 of the article cited above. Such materials include, for example, polyester (e.g. such as that sold under the trademark HS Mylar); regular, cross linked and irradiated polyethylenes; polypropylene; polystyrene, polyvinyl chloride; polyvinylidene chloride copolymers and rubber hydrochlorides. Further included are the biaxially oriented polyethylenes of the type described (column 2, lines 5 to 30 inclusive) in U.S. Patent No. 3,215,266; and polyvinyls of the type described in U.S. Patent No. 3,175,752.

Another important characteristic of these films, in addition to their ability to contract in length and/or width when heated, is their ability to heat-seal to themselves. This characteristic is also relied upon in many shrink packaging applications for forming heat-sealed edges which constitute the sealed perimetrical portion of a given package. With few exceptions, shrink films have this natural heat-sealing capability. Where no such natural capability exists, it may be imparted by coating the shrink film with compounds capable of bonding under heat and pressure.

As used henceforth herein, the term "sealed edge" means a perimetrical portion of a package wherein a closure is effected by sealing two juxtaposing surfaces. Various sealing techniques, well known to those skilled in the art, may be utilized and these include, for example, ultra-sonic sealing, solvent sealing and the aforementioned heat sealing. The surfaces may be of the same piece or of two different pieces of axially oriented heat-sealable thermoplastic film. Alternatively, they may comprise a piece of such film and a piece of non-heat sealable material (e.g. a backing board) which has been coated to impart heat-sealing characteristics, or two pieces of non-heat sealable axially oriented film (e.g. polyester) both of which have been coated with heat-sealing material or any combination of the above. Special treatment of the films to adapt them to solvent and ultra-sonic bonding techniques is also encompassed since it is common to adapt the films for particular sealing applications provided only that they have the essential heat shrinking characteristic. It is common, for instance, in applications where a package comprises a backing board and a piece of axially oriented plastic film, to coat or impregnate the cardboard with polyvinyl chloride so that a shrink film, usually of the same material, can be heat-sealed thereto.

Heat sealing may be effected by pressing an electrical impulse heated wire or bar against two abutting pieces of film and thereby raising the temperature quickly at the immediate site of the heat-sealed edge into the sealing temperature range (e.g. 180–500° F.) of the particular film being used. A common type of device used with rolls of bi-folded film is called an "L-sealed" because the heated wire or bar is L-shaped and thus creates two adjoining edges simultaneously. The heated wire or bar in such machines also cuts through the film to trim the heat-sealed edges of the package. Once the wrapping and heat-sealing operations are performed, the package is passed through a heating zone which causes shrinkage of the film and tensions it about the wrapped item.

Opening shrink film packages if often difficult. This is true because the film, being under tension, has no loose or sagging areas where tearing can be easily initiated. Further, many of the films have a high uninitiated tear resistance making it extremely difficult to start a tear. Additionally, once the tear has been started, characteristics other than uninitiated tear resistance come into play and it is difficult to control the direction of the tear.

Tear initiating means found in the prior art, and suitable for materials such as cellophane, have been found generally unsuitable for axially oriented films. Various suggestions have been made for opening shrink packages including those shown in U.S. Patents Nos. 3,175,752 and 3,215,267. There is nonetheless a great need for an inexpensive shrink film package incorporating quick opening means.

SUMMARY OF THE INVENTION

Briefly summarized, the invention provides a shrink film package which includes an integral longitudinally extending cutter positioned about the item to be wrapped, between it and the heat-shrunk tensioned film. One end of the cutter extends outwardly through the film, preferably through a sealed edge, so that it may be grasped for opening the package and the other end is frictionally detented within the package.

Frictional detention is the essential difference between the embodiments herein exemplified and those of the parent patent referred to above. In the parent package various means are disclosed and claimed for actually anchoring one end of the cutter within the package including attachment to the wrapped item or attachment to the film as with glue, stitching, staples and other equivalent techniques. Here, on the other hand, no such positive anchorage is provided and instead there is frictional detention. This may come merely from selection of parameters such as the shape of the wrapped item, the character of the surface of the wrapped item and/or the film, the type of cutter, the length of the cutter, etc. or may be artificially enhanced by increasing the coefficient of friction of the cutter, film and/or item to be wrapped.

Regardless of the technique used, the force exerted when the extending end of the cutter is pulled toward the other end, in the direction in which the cutter extends about the item, is less than the frictional detention forces so that, just as in the prior embodiments, progressive cutting of the film occurs. The same effect is achieved herein by permitting both ends of the cutter to extend through a sealed edge so that frictional detention forces may be supplemented by grasping one end of the cutter while pulling the other end toward it in the manner described.

Accordingly, it is an object of the invention to provide a shrink film package which includes integral easy to operate, foolproof quick opening means.

An additional object of the invention is to provide a shrink package which permits opening with a longitudinally extending cutter which is located about the item, under the film, and which has an end protruding to the exterior of the package where it can be grasped and pulled to cause progressive tearing of the film.

It is a further object of the invention to provide a shrink package which permits opening to be quickly and easily initiated, even when utilizing films having a high uninitiated tear resistance, and wherein the film can then be progressively cut in a predetermined line despite any tendency of the cut to craze or change direction.

It is also an object of the invention to provide a package of the type described wherein there is no necessity for providing separate anchoring means for the cutter but wherein reliance is placed upon natural or artificially enhanced frictional detention of the non-manipulated cutter portion within the package during the opening thereof.

A further object of the invention is to provide a package wherein the means provided for predetermining the cutting direction will not unduly reduce the effective tensile strength of the film and thus permit the package to open during shrinking but where, nonetheless, selective reduction of tensile strength along the cutter site is possible.

Still another object of the invention is to provide an inexpensive, rugged package suitable for all axially oriented thermoplastic films which possess, or have had imparted to them sealing characteristics, which package can be easily and readily opened and which is made by simple, inexpensive methods.

These and other objects of the invention will be apparent to those skilled in the packaging art from a consideration of the description which follows in conjuction with the drawing.

It should be appreciated that neither the abstract of the disclosure nor the summary of the invention above is intended to constitute a limitation on its extent. They are inserted merely as aids in information retrieval and, therefore, the true scope of the invention is to be determined only by a reasonable interpretation of the appended claims in light of the description below.

BRIEF DESCRIPTION OF THE DRAWING

In the drawing, wherein like reference letters and numerals designate like parts:

FIGURE 1 represents a perspective view of a package embodying the invention.

FIGURE 2 represents a section taken on line 2—2 of FIGURE 1.

FIGURE 3 represents a perspective view of another package embodying the invention.

FIGURE 4 represents a section taken along line 4—4 of FIGURE 3.

FIGURE 5 represents still another package embodying the invention, also shown in perspective.

FIGURE 6 represents a section taken on line 6—6 of FIGURE 5.

DESCRIPTION OF THE PREFERRED
EMBODIMENTS

Referring now to the drawing it will be observed that all embodiments include an item to be wrapped designated A, a longitudinally extending cutter B and a sheet of over-wrapping axially oriented film C in heat shrunk juxtaposition to the item A. As shown, the cutter B is positioned between the item A and the film C, extending about although not necessarily around item A.

Elongated cutter or cutting member B is of relatively high tensile strength and is preferably a thread or cord which may be made of a natural or synthetic fiber or which may be metallic. The material chosen is preferably one which will not char at the heat sealing temperature of the film chosen or which will not be adversely effected by solvents if solvent sealing is utilized. In heat sealing it has been found that due to the nature of hot wire impulse heating, it is possible to use fibers which, in theory, would char at heat-sealing temperatures and to form heat-sealed edges about such fibers. In L-sealers ordinary mercerized cotton has been used with polyvinyl chloride film (which seals between 275 and 345° F.) without charring of the thread.

Considering FIGURES 1 and 2 which may be regarded as representative of the invention, it will be noted that item A — shown in idealized form as a generally parallelepipedal solid, includes a front end 10, a back end 11, a top 12, a bottom 13 and a side 14.

Cutter B, which is of a fixed and predetermined length includes a first end 20, a second end 21 and an intermediate portion 22. The length of the cutter is determined by the characteristics of the package with its maximum length being the total perimeter of the item to be wrapped plus enough more to allow for the extension of at least one end to the exterior of the package. In the case of the package shown in FIGURES 1 and 2 the cutter goes about a portion of end 10, all of top 12, all of end 11 and a portion of bottom 13 so that end 21 is entirely within the package.

The package may be made by methods such as those described in my parent patent. Suitable methods would include the steps of positioning the cutter about the item, wrapping film C about the item with at least one cutter end such as piece 20 passing over the future site of a sealed edge and, thereafter, sealing the edges so as to form the package. It will be noted that the packages shown have two such sealed edges — end edge 30 and side edge 31. However, since the technique of the instant invention is applicable to pre-formed envelopes, as few as one edge can be present and as many as four without effecting the nature of the opening technique.

During the subsequent heat shrinking step, the cutter is compressed against the item A by the tension created in film C. When a tearing force is exerted, as by grasping end 20 to open the package, it is resisted by the frictional detention effect of this tension holding the cutter against the item. The contour of item A, such as the corners which the cutter has to turn, will also contribute to the frictional detention. The coefficients of friction may be enhanced by coating the cutter and/or selected portions of the surfaces of item A with friction creating compositions such as, for example, lacquers containing solid particulate matter, rubber latex compositions and even glues or mucilages which, while not strong enough to constitute permanent anchors, do add to the frictional effect. The film C itself can be provided with a rough calendered surface or an anti-slip coating. If the cutter is coated it is possible to embody into the coating a solvent such as, for example, cyclohexanone (where polyvinyl chloride film is used) which gives the added advantage of weakening the film at the cutter site.

To open the package of FIGURES 1 and 2, end 20 is grasped and pulled upward along end 10 and then back along top 12 and so forth to the terminus of the cutter. By the time the cutter is about half way around the item the package is, for all intents and purposes, open since the film can easily be removed. During the tear initiation period, when cutting force requirements are the greatest, the demand has been matched by the existence of the greatest frictional detention forces.

The embodiments in FIGURES 3 to 6 are almost self-explanatory. In both of the embodiments, the length of cutter B is such that ends 20 and 21 extend through sealed edge 30. However, in the embodiment of FIGURES 3 and 4 the ends protrude at spaced apart locations along edge 30 whereas in the embodiment shown in FIGURES 5 and 6 the ends 20 and 21 come through edge 30 at the same location. The embodiment shown in FIGURES 3 and 4 has the advantage that opening may be effected by grasping one end while holding the other to thus supplement frictional detention forces. In fact, opening may be accomplished by merely grasping both ends and pulling them apart. While in these embodiments the ends are shown coming through the same heat sealed edge they may come through different edges depending on the contour of the item and the length of cutter which would be left within the package vis-a-vis the desired line of tearing for most effective opening. The tear line of the embodiment in FIGURES 3 and 4 will be off-center while the embodiment shown in FIGURES 5 and 6 will give a tear line along a central plane.

Obviously, many modifications and variations of the invention as herein before set forth may be made without departing from the spirit and scope thereof. Therefore, only such limitations should be imposed as are indicated in the appended claims.

I claim:
1. A package which comprises:
   (a) an item to be wrapped
   (b) a piece of axially oriented thermoplastic film in tensioned, heat-shrunk juxtaposition to said item, said film including at least one sealed edge, and
   (c) a longitudinally extending cutter positioned about said item, between it and said film, said cutter being frictionally detented with respect thereto, at least one end of said cutter passing through and being encapsulated within said sealed edge and having its terminal portion extending outwardly beyond said edge;
opening of said package being effected by pulling the extending end of said cutter toward the other end in the direction which said cutter extends, with a force less than frictional detention forces, to thereby cause progressive cutting of said film.

2. The package of claim 1 wherein said frictional detention is enhanced by treatment of the surface of said cutter to increase its coefficient of friction.

3. The package of claim 1 wherein said frictional detention is enhanced by treatment of the surface of said item to increase its coefficient of friction.

4. The package of claim 3 wherein said frictional detention is further enhanced by treatment of the surface of said cutter to increase its coefficient of friction.

5. The package of claim 1 wherein both ends of said cutter extend outwardly through a sealed edge to enable one end of said cutter to be grasped while the other end is pulled toward it.

6. The package of claim 5 wherein the ends of said cutters extend through said sealed edge at spaced apart locations to facilitate grasping thereof.

7. The package of claim 1 wherein said cutter is impregnated with a solvent for said film to weaken the film along the tearing line defined by the cutter.

References Cited

UNITED STATES PATENTS

| | | | |
|---|---|---|---|
| 147,697 | 2/1874 | Smith | 229—51 X |
| 1,630,542 | 5/1927 | Schulz | 229—51 X |
| 1,684,421 | 9/1928 | Thompson | 229—51 X |
| 2,684,877 | 7/1954 | Gerrish | 229—51 X |
| 2,870,953 | 1/1959 | Parker et al. | 229—51 |
| 2,956,886 | 10/1960 | Baush. | |
| 3,061,169 | 10/1962 | Yermakoff et al. | 229—51 |
| 3,188,215 | 6/1965 | Snow. | |
| 3,254,758 | 6/1966 | Guyer | 229—51 |
| 3,338,404 | 8/1967 | Becker et al. | 229—51 X |
| 3,352,480 | 11/1967 | Forman | 229—51 |

DAVIS T. MOORHEAD, Primary Examiner

U.S. Cl. X.R.

227—51